United States Patent [19]
Petty et al.

[11] 3,941,994
[45] Mar. 2, 1976

[54] TAIL LIGHT AND FENDER

[75] Inventors: Preston L. Petty; Albert F. Harreld, both of Newberg; Gary M. Scott, Dundee, all of Oreg.

[73] Assignee: Preston L. Petty, Newberg, Oreg.

[22] Filed: Dec. 9, 1974

[21] Appl. No.: 530,858

[52] U.S. Cl............... 240/8.1 R; 240/7.55; 240/8.3
[51] Int. Cl.²........................................ B60Q 1/30
[58] Field of Search............. 240/7.12, 7.55, 8.1 R, 240/8.3 R, 8.2, 58, 151

[56] References Cited
UNITED STATES PATENTS

| | | | |
|---|---|---|---|
| 2,148,870 | 2/1939 | Mead et al. | 240/8.1 R |
| 3,828,178 | 8/1974 | Bickel | 240/8.3 X |

FOREIGN PATENTS OR APPLICATIONS

| | | | |
|---|---|---|---|
| 944,201 | 10/1948 | France | 240/58 |
| 852,951 | 10/1952 | Germany | 240/7.55 |
| 685,594 | 3/1965 | Italy | 240/7.55 |
| 627,802 | 11/1961 | Italy | 240/8.3 |
| 709,651 | 6/1954 | United Kingdom | 240/7.55 |

*Primary Examiner*—L. T. Hix
*Assistant Examiner*—Alan Mathews

[57] ABSTRACT

A vehicle fender is provided with an integral light mounting member extending outwardly from the fender in which a light bulb is secured and integral lens mounting members extending outwardly from the fender which secure a lens onto the fender over the light bulb thereby providing a tail light.

5 Claims, 4 Drawing Figures

TAIL LIGHT AND FENDER

BACKGROUND OF THE INVENTION

Vehicle fenders are known which include a formed or molded area which provides a rear or tail light mounting area. The tail light is most generally a complete light structure including a housing of metal having a light socket and a lens. This assembly is generally bolted into position onto the tail light mounting area of the vehicle fender.

The tail light assembly can include a license plate mounting section which is illuminated by a colorless section of the lens or through an opening in the housing. Alternatively, the fender can be provided with a license plate mounting area below the tail light mounting area.

The above described tail light assembly provides a protruding area of the vehicle fender that is unattractive, makes it difficult to get on and get off the vehicle if it is a motorcycle and presents a hazard to the rider in case the rider of necessity has to quickly get off the motorcycle.

SUMMARY OF THE INVENTION

The present invention relates to a tail light and fender assembly and more particularly to a tail light and fender assembly.

An object of the present invention is to provide a vehicle fender and tail light wherein the lens is mounted onto mounting means of the fender on an area of the fender.

Another object of the present invention is the provision of a vehicle fender and tail light with the fender having mounting means for securing a light socket onto the fender.

A further object of the present invention is to provide a vehicle fender and tail light wherein the tail light lens projects only slightly outwardly from the surface of the fender.

An additional object of the present invention is the provision of a vehicle fender and tail light wherein the fender has a license plate area which is part of the mounting means for the lens of the tail light.

These and other objects will become apparent upon a reading of the specification in conjunction with the drawing illustrating a preferred embodiment of the invention. However, it is to be understood that changes may be made from the exact details shown and described without departing from the principles of the invention.

DETAILED DESCRIPTION OF THE INVENTION

Figure 1:
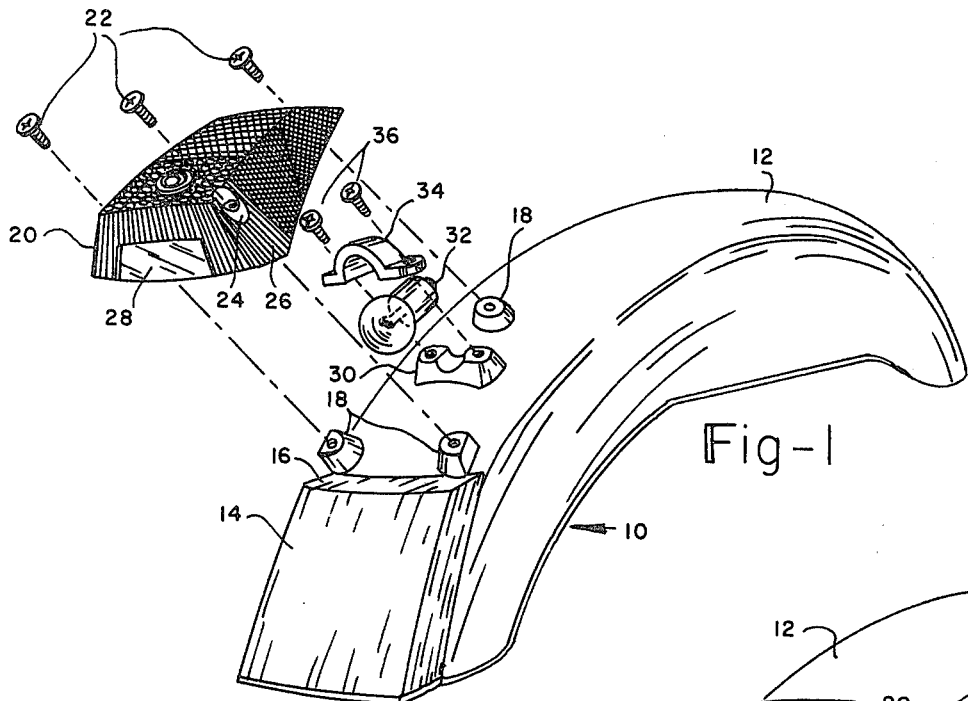
FIG. 1 is an exploded perspective view of the vehicle fender and tail light.
Figure 2:
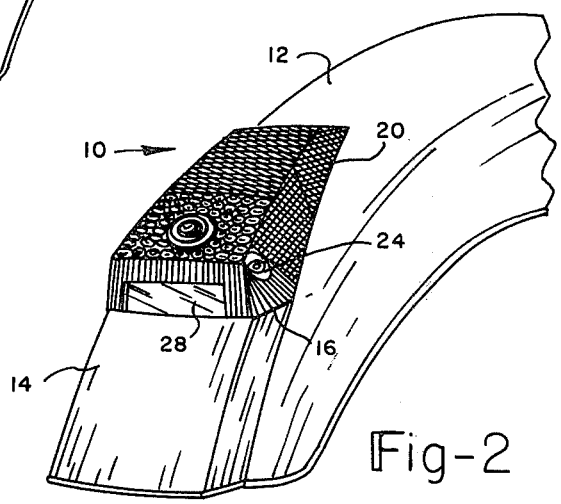
FIG. 2 is a part perspective view of the vehicle fender and tail light in an assembled condition.
Figure 4:
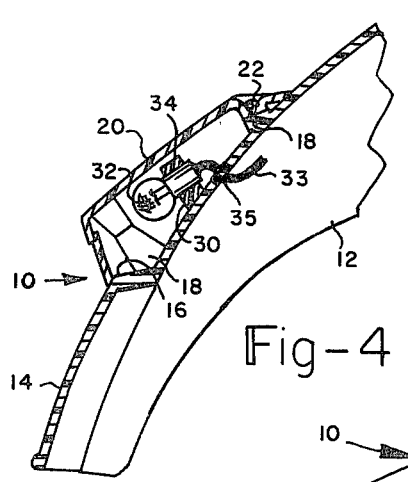
FIG. 4 is a cross-sectional view of the rear section of FIG. 3.
Figure 3:
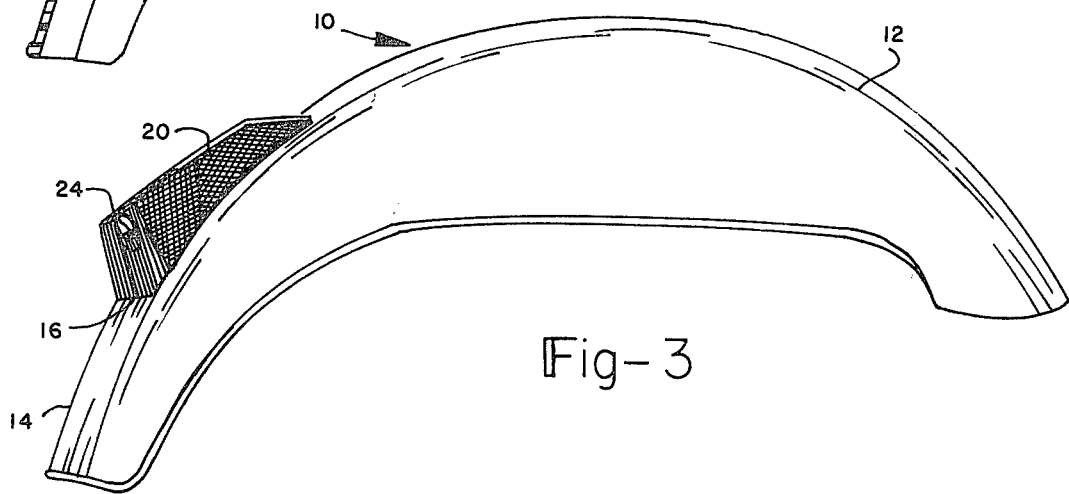
FIG. 3 is a side elevational view of the vehicle fender and tail light.

Turning now to the drawing, a vehicle fender and tail light 10 is illustrated. This fender and tail light will be described in conjunction with a motorcycle but it can be used on other types of vehicles. Vehicle fender and tail light 10 includes a fender 12 which is preferably molded from a suitable plastic but it can of course be made from metal or other material as desired and it can take other forms other than that illustrated relative to its overall configuration.

Fender 12 has a rectangular area 14 in the form of a projection at its rear section onto which a license plate (not shown) is secured. The top of rectangular area 14 is a bended surface 16.

Spaced projections 18 extend outwardly from fender 12 as integral parts thereof and serve as spacing and securing means for lens 20 which is secured onto projections 18 via screws 22 that extend through holes 24 in lens 20. Projections 18 are solid and have holes therein to receive the screws to securely maintain the lens in position on the fender as well as providing support for the lens.

Lens 20 is molded from a high impact plastic that has excellent light transmitting characteristics. Lens 20 has a bottom beveled surface 26 which mates with beveled surface 16 to assist in the mounting of the lens on the fender. Lens 20 also includes a transparent section 28 at its bottom which secured in position by glue or other conventional securing means and this transparent section illuminates the license plate secured on rectangular area 14.

Projection 30 extends outwardly from fender 12 and has a concave area in which a light socket 32 having a light bulb therein is disposed. A clamp 34 is secured via screws 36 that screw into projection 30 to secure the light socket in position. The electric wires 33 for the light socket 32 extend through a hole 35 adjacent projection 30 and along the inside surface of the fender 12. In the event the fender is made of metal or material having conductive material, the light socket can be electrically connected in a conventional manner for similar vehicle fenders of conventional construction.

As can be discerned the integral vehicle fender and tail light provides a tail light assembly that projects only slightly above the fender surface which does not hinder getting on and off a motorcycle and a projection that can harm a rider if thereon. The lens 20 has a configuration along its periphery which enables it to engage the fender surface while covering the projections 18 and 30 and light socket and when lens 20 is secured in position on the fender via screws 22 and projections 18 a tight engagement is achieved between lens 20 and fender 12 such that moisture is prevented from getting into the lens. A sealing grommet is provided for the electrical wires 33 as they pass through hole 35.

Although the invention has been described and illustrated with reference to a particular embodiment, it is to be appreciated and understood that various adaptations and modifications may be made without departing from the scope of the invention as set forth by the appended claims.

The invention is claimed in accordance with the following:

1. A vehicle fender and tail light comprising:
    a fender having integral spaced mounting means extending outwardly from an outer surface of said fender;
    another integral mounting means provided by said fender and extending outwardly from said outer surface of said fender;
    light socket means disposed in said other mounting means including means to secure said light socket means in position therein;

lens means having a configuration conforming to said outer surface and covering said mounting means and said light socket means secured in said other socket means; and securing means engaging said lens means and said spaced mounting means securing said lens means in position on said fender.

2. A vehicle fender and tail light according to claim 1 wherein said fender includes a substantially flat area below said lens means onto which a license plate can be secured.

3. A vehicle fender and tail light according to claim 2 wherein said lens means includes a transparent section to illuminate said flat area.

4. A vehicle fender and tail light according to claim 3 wherein said spaced mounting means are solid and are spaced from each other in a triangular configuration.

5. A vehicle fender and tail light according to claim 2 wherein said lens means and flat area have mating beveled surfaces.

* * * * *